United States Patent [19]
Fluoret

[11] 3,862,926
[45] Jan. 28, 1975

[54] SIMPLIFIED METHOD FOR THE MANUFACTURE OF THE THYROTROPIN RELEASE HORMONE

[75] Inventor: George Rogelio Fluoret, Deerfield, Ill.

[73] Assignee: Abbott Laboratories, Chicago, Ill.

[22] Filed: Apr. 2, 1973

[21] Appl. No.: 345,029

Related U.S. Application Data

[63] Continuation-in-part of Ser. No. 61,790, Aug. 6, 1970, abandoned.

[52] U.S. Cl. .................................... 260/112.5
[51] Int. Cl. ................. C07c 103/52, C07g 7/00
[58] Field of Search .............................. 260/112.5

[56] References Cited
UNITED STATES PATENTS 3,737,422    6/1973    Flouret .................. 260/112.5
3,746,697    7/1973    Folkers et al. ........... 260/112.5
3,752,800    8/1973    Wissmann et al. ......... 260/112.5
3,753,969    8/1973    Folkers et al. ........... 260/112.5
3,757,003    9/1973    Folkers et al. ........... 260/112.5

OTHER PUBLICATIONS

E. Schroeder and K. Lubke, "The Peptides," Vol 1, Academic Press, New York, 1965, pp. 97–105.

Primary Examiner—Lewis Gotts
Assistant Examiner—Reginald J. Suyat
Attorney, Agent, or Firm—Paul D. Burgauer; Robert L. Niblack

[57]  ABSTRACT

A simplified method for the preparation of pyroglutamylhistidylproline amide is disclosed. The new method produces good yields of the material and requires no isolation or purification of intermediates.

6 Claims, No Drawings

SIMPLIFIED METHOD FOR THE MANUFACTURE OF THE THYROTROPIN RELEASE HORMONE

HISTORY OF THE INVENTION

This application is a continuation-in-part of U.S. Ser. No. 61,790, filed Aug. 6, 1970, now abandoned.

DETAILED DESCRIPTION OF THE INVENTION

In recent publications, theories were advanced and subsequently proven that the structure of thyrotropin releasing factor or hormone (hereinafter simply referred to as TRH) corresponds to that of pyroglutamylhistidylproline amide. TRH is an extremely valuable drug and laboratory tool, particularly useful in the analysis of pituitary gland functions.

TRH can be prepared synthetically, using the tripeptide glutamylhistidylproline as starting material. This method is obviously expensive because the starting material requires a large number of steps for its preparation. Natural TRH may also be isolated from natural sources but this method is also uneconomical because the yield from 165,000 porcine hypothalami amounts to only about 4.4 mg. This clearly demonstrates the necessity for a practical synthetic route. Also, the purity of the product extracted from natural sources is too questionable to be of use as a drug for thyroid disorders.

Synthetic methods starting with the individual amino acids have also been tried but leave much to be desired; for instance, the methods suggested to date require many steps to protect certain groups within the molecules that take part in the reaction. After each reaction step, the protective groups must be removed in a separate procedure. Thus, a classic method of building up the desired tri-peptide would involve the use of 2-3 "protection" steps on amino acids starting materials, two essential reaction steps, and 2-3 steps to remove the protective groups, with purification steps necessary for each intermediate. These purifications are particularly cumbersome and, in a practical synthetic route, should be reduced to the minimum in number and should be such that they can be carried out easily and with useful quantities of material.

It is therefore an object of the present invention to provide a practical synthetic method for the production of TRH; it is a particular object of this invention to provide a synthetic method for the preparation of TRH which does not involve the isolation and/or purification of intermediate di-peptides; it is a further object of the present invention to prepare TRH in good yields from easily accessible starting materials.

These and other objects are accomplished by reacting a solution of an active ester of pyroglutamic acid in an inert, polar, organic solvent with an aqueous solution of 0.75–1.0 molar equivalent of histidine and 1–2 equimolar amounts of an alkali hydroxide at a temperature of between 0° and 40° C., for a period of between 5 minutes and 5 hours, adding to the reaction mixture at least one molar equivalent of proline amide hydrochloride and hydrochloric acid to adjust the pH to 6–6.5 at a temperature of between 0° C. and room temperature and after dissolution of said amide, adding 1–2 molar equivalents of an epimerization inhibitor, cooling the mixture to 0° C. under agitation, adding at least one molar equivalent of dicyclohexylcarbodiimide dissolved in an inert, polar, organic solvent and maintaining the stirred mixture at a temperature between −10° and +10° C. for at least 10 hours.

In a preferred embodiment of the present process, the concentrations of the reactants in their respective solvents are chosen in such a manner that the final molar concentration of TRH is between 0.3 and 0.5. As the polar, organic, inert solvent used for adding the above dicyclohexylcarbodiimide or the active ester of pyroglutamic acid, dimethylformamide, dimethylacetamide, tetrahydrofuran, pyridine and other inert liquids may be used. The term "inert" is used to convey that the material does not react with any of the reactants, products or by-products present in the reaction mixture.

The term "active esters of pyroglutamic acid" referred to above refers to those esters which, under standard coupling procedures, will form the free pyroglutamic acid in situ at a similar rate as the rate with which the latter will couple with the N-terminus of the histidine. Such esters have been described in the literature for a variety of other amino acids. In the present setting, the preferred active esters are the pentachlorophenyl, 2,4,6-trichlorophenyl, p-nitrophenyl, 2,4-dinitrophenyl, N-hydroxy-5-norbornene-2,3-dicarboximide, 1-hydroxybenztriazol and the N-hydroxysuccinimide esters of pyroglutamic acid.

The above reference to an epimerization inhibitor is to be understood in the sense of Zimmerman and Anderson, J.A.C.S., 89, 7151 (1967); a commonly used inhibitor is N-hydroxysuccinimide but other reagents with a N-hydroxyamido group or certain α-hydroxy amino compounds are similarly suitable.

The main advantage of the new process is based on the fact that the whole step-wise construction of the desired tri-peptide can be done in a single reaction vessel, requiring no isolation and/or purification of an intermediate. Another advantage of the new procedure lies in the fact that no blocking groups are required to prevent certain functional groups of any individual amino acid from reacting when other functional groups of the same acid are to undergo a condensation. This obviates the removal of these protecting groups and, of course, the preparation of starting materials in separate procedures with the accompanying losses from such reactions. A further advantage of the new procedure is the fact that it can be used for medium and large size batches as well as for micro-scale batches, i.e., for analytical or diagnostic preparations using radioactive carbons in the one or the other of the three amino acids from which the present process produces TRH.

The resulting product mixture can be worked up in one of two ways, depending mainly on the size of the batch; if the batch is large, the solution is placed on a chromatographic column using silica gel as the adsorbent and a combination of methanol and chloroform as the eluent. If the batch is small, e.g., 1 mg. or less, the final solution is purified by preparative thin layer chromatography. This method is mainly used for the preparation of radioactively labeled TRH with high activity which demands a minimum of manipulations of intermediates. The overall yield usually obtained by the process of the present invention is about 40% of theory.

It is to be understood that the following examples are given here only for the purpose of illustration; they are not meant to limit the invention in any respect.

EXAMPLE 1

Pyroglutamylhistidine: A solution of 1.134 g. of pyroglutamic acid pentachlorophenyl ester in 6.5 ml. of dimethylformamide is added at once to a solution of 465 mg. of histidine in 1.5 ml. of 2 N sodium hydroxide. A clear solution forms which slowly shows deposition of a gelatinous material. After 1 hour, the mixture is neutralized with 1 N hydrochloric acid. The mixture is then evaporated to dryness and the residue is dissolved in methanol/chloroform 2:1. This solution is applied to 20 g. of silica gel in a chromatographic column which is then eluted with methanol/chloroform 2:1. Suitable fractions (identified by thin layer chromatography using silica gel G, methanol/chloroform 2:1 and a chlorine-tolidine spray) yield 600 mg. (75% of theory) of pyroglutamylhistidine.

EXAMPLE 2

A solution of 465 mg. of L-histidine in 1.5 ml. of 2 N sodium hydroxide is added at room temperature to a solution of 1.134 g. of L-pyroglutamic acid pentachlorophenyl ester in 6.5 ml. of dimethylformamide. A clear solution results which, on standing, shows deposition of a gel-like material. The condensation product which forms, e.g., the sodium salt of L-pyroglutamyl-L-histidine can be detected by thin layer chromatography using 66% methanol in chloroform as the solvent and the chlorine-tolidine color reaction for identification. The progress of the reaction can thus be followed and it is apparent that most of the reaction takes place in the first few minutes. After one hour, the intensity of the spot caused by the presence of L-pyroglutamyl-L-histidine does not increase substantially.

To this water/dimethylformamide solution of L-pyroglutamyl-L-histidine sodium salt is added 498 mg. of L-proline amide hydrochloride in 1.5 ml. of water and after the amide is completely dissolved, 381 mg. of N-hydroxysuccinimide is added to prevent epimerization of the $\alpha$-carbon of the histidyl residue upon activation of the carboxy group in the pyroglutamylhistidine. The solution is cooled to 0° C. and a solution of 1.238 g. of dicyclohexylcarbodiimide in 1 ml. of dimethylformamide is added. The reactants are now stirred overnight at a temperature between 0° and 10° C. The progress of this reaction may be followed by thin layer chromatography in the same manner as described above. When the reaction is essentially complete, the mixture is filtered to remove the formed dicyclohexylurea and the filtrate is directly placed on a chromatographic column containing 30 g. of silica gel packed in methanol/chloroform 1:19. Elution of the column with methanol/chloroform 1:19 results in the removal of faster moving components. The desired TRH elutes with methanol/chloroform 1:2 and evaporation of the eluate produces TRH which may contain traces of hydrochloric acid. The isolated, dry material is dissolved in methanol and passed through a basic ion exchange resin to yield 420 mg. of pure TRH which is identified by comparison with a standard sample of TRH by thin layer chromatography in methanol/chloroform 2:1 and by electrophoresis which reveals identical mobilities. The material has an optical rotation $[\alpha]_D^{25} -64.8°$ (c 1.25, $H_2O$).

EXAMPLE 3

A solution of 46.3 g. of 2,4,6-trichlorophenyl pyroglutamate in 100 ml. of DMF is combined with a solution of 15.5 g. of histidine in 46 ml. of water containing 4 g. of sodium hydroxide at 20° C. To this mixture is added a solution of 15.06 g. proline amide hydrochloride in 10 ml. of water. After stirring for 16 hours, 12.65 g. of N-hydroxysuccinimide in 15 ml. of DMF (= dimethylformamide) and 41.25 g. DCCI (= dicyclohexylcarbodiimide) in 25 ml. of DMF is added. The formed dicyclohexylurea is filtered off and the filtrate is diluted with ethyl acetate, precipitating the desired tripeptide. By working up the reaction product as in Example 2, a yield of 9.6 g. of TRH (25% of theory) is obtained.

EXAMPLE 4

A solution of 11.3 g. of pyroglutamyl succinimide in 300 ml. of DMF is reacted with 9.66 g. of sodium histidine in 24 ml. of water at 20° C. and to the resulting dipeptide solution is added a solution of 7.5 g. of proline amide hydrochloride in 5 ml. of water. The mixture is stirred in the presence of 5.75 g. of N-hydroxysuccinimide in 20 ml. of DMF and 20.63 g. of DCCI in 20 ml. of DMF at 5°–10° C. for 16 hours. The reaction mixture is worked up as in Example 2, leaving 5.2 g. (28%) of TRH before final purification by chromatography.

EXAMPLE 5

In a modification of Example 2, essentially the same procedure and starting materials are used, except that the ratios thereof are changed. Instead of using 1.5 ml. of 2 N sodium hydroxide, 3 ml. of the same solution is used and, after the proline amide is added, the pH of the mixture is adjusted to $6.25 \pm 0.25$ by the addition of 2 N hydrochloric acid. The resulting TRH is of a purity of >94% and is obtained in a yield of 450 mg., containing only 1–1.5% of any amino acid or di-peptide fragment.

In a modification of this procedure, a 50% excess of the pyroglutamic acid pentachlorophenyl ester is used, resulting in substantially the same yield (based on histidine) as above but with less of the unreacted histidine present in the final product (<0.5%).

Further investigation of this procedure reveals that the reaction between the active ester of pyroglutamic acid and the histidine proceeds equally well at temperatures of 0° and 40° C.

EXAMPLE 6

Microsynthesis suitable for radioactive labeling: A solution of 2.44 mg. of pentachlorophenyl pyroglutamate in 25 $\mu$l. of warm dimethylformamide is added to a solution of 1 mg. of histidine in 3.3 $\mu$l. of 2 N sodium hydroxide. After adding an additional 20 $\mu$l. of dimethylformamide, a clear solution results and after 1 hour, 1.07 mg. of proline amide hydrochloride in 2 $\mu$l. of water is added followed by the addition of 0.82 mg. of N-hydroxysuccinimide. The mixture is agitated for 10 minutes, cooled to 0° C. and 2.66 mg. dicyclohexylcarbodiimide is added as a solid to the sides of the reaction vessel from where the dimethylformamide vapors dissolve it into the reaction mixture. The reaction mixture is agitated overnight at a temperature of 0° to 5° C. in a cold room. For purification, preparative thin layer chromatography is preformed and the reaction mixture is directly applied to a large thin layer plate which is marked at each end with TRH standard and developed in methanol/chloroform 2:1. After suitably covering the area where the reaction mixture has been applied and developed, the thin layer chromatography plate is sprayed with a chlorine-tolidine spray to detect the position of TRH. The area of the plate corresponding to labeled TRH is scraped to remove the adsorbent which in turn is placed in a small column and eluted with methanol//chloroform 1:2. The eluate is worked up as shown in Example 2.

Although the above process is demonstrated by using sodium hydroxide as the alkali necessary for dissolving histidine, it will be clear that potassium hydroxide, lithium hydroxide and the corresponding carbonates or bicarbonates may be used in its place. Preferably, a base is used which enables sufficiently high concentrations of the histidine so that the resulting tripeptide solution is within a concentration range of between 0.25 and 0.5 moles per liter.

What is claimed is:

1. The process of making L-pyroglutamyl-L-histidyl-L-proline amide consisting essentially in reacting a solution of an active ester of L-pyroglutamic acid in an inert, polar, organic solvent with an aqueous solution of 0.75–1.0 molar equivalents of L-histidine and 1-2 equimolar amounts of an alkali hydroxide at a temperature of between 0° and 40° C. for a period of between 5 minutes and 5 hours; adding at least one molar equivalent of L-proline amide hydrochloride and sufficient hydrochloric acid to adjust the pH to between 6.0 and 6.5 at a temperature of between 0° C. and room temperature and, after dissolution of said amide, adding 1-2 molar equivalents of an epimerization inhibitor, cooling the mixture under agitation to 0° C., adding at least one molar equivalent of a solution of dicyclohexylcarbodiimide in an inert, organic, polar solvent, and stirring the mixture at a temperature of between −10° and +10° C. for a period of at least 10 hours.

2. The process of claim 1 wherein said inert, polar, organic solvent for said pyroglutamate and for said dicyclohexylcarbodiimide is dimethylformamide.

3. The process of claim 1 wherein said alkali hydroxide is sodium hydroxide.

4. The process of claim 1 wherein said active ester of pyroglutamic acid is the pentachlorophenyl L-pyroglutamate.

5. The process of claim 1 wherein said active ester of pyroglutamic acid is the N-hydroxysuccinimide L-pyroglutamate.

6. The process of claim 1 wherein said active ester of pyroglutamic acid is the 2,4,6-trichlorophenyl L-pyroglutamate.

* * * * *